United States Patent Office 2,800,402
Patented July 23, 1957

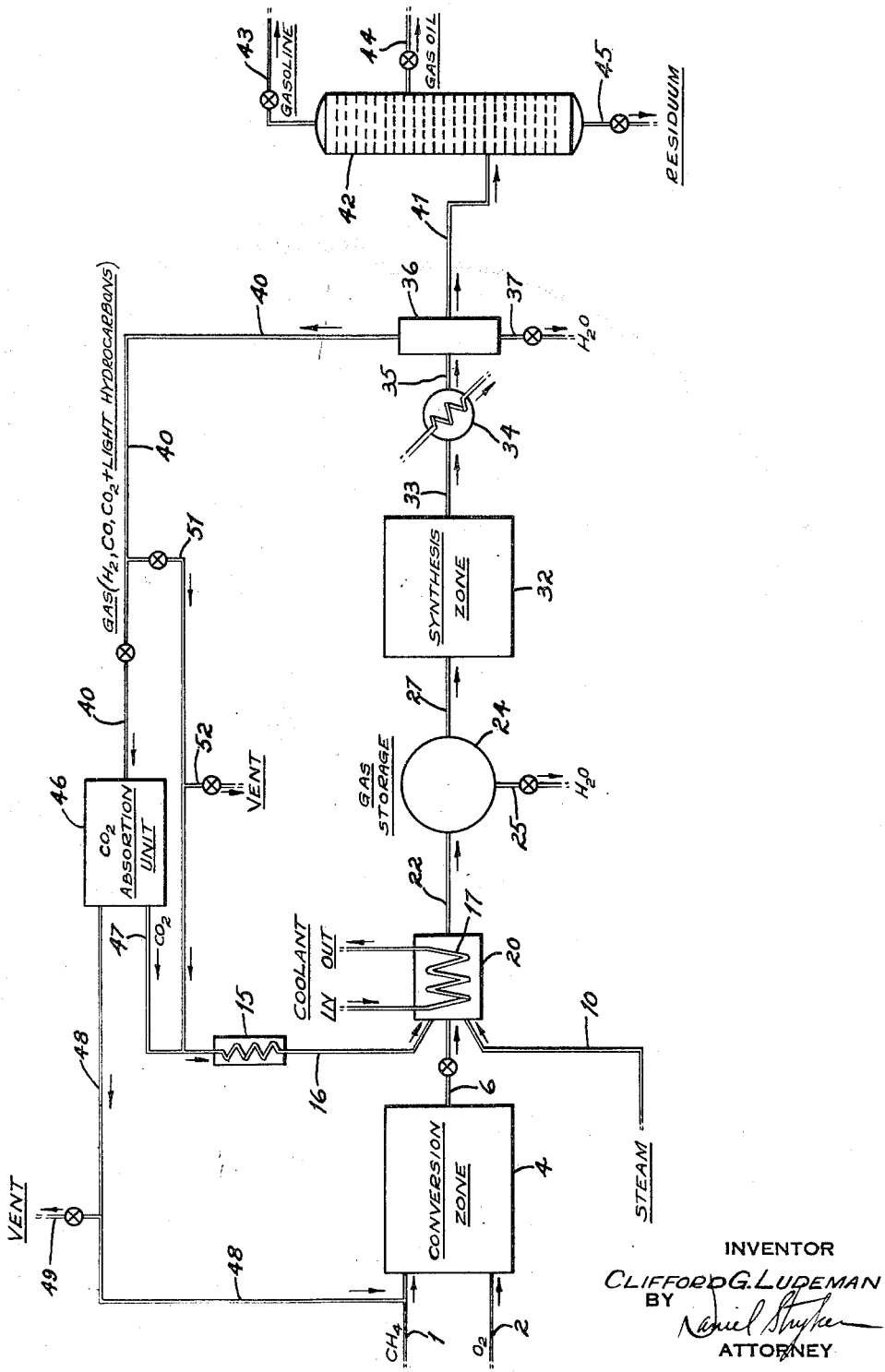

2,800,402

METHOD OF PREPARATION AND CONVERSION OF SYNTHESIS GAS

Clifford G. Ludeman, Eastchester, N. Y., assignor to Texaco Development Corporation, New York, N. Y., a corporation of Delaware Continuation of application Serial No. 656,480, March 22, 1946. This application October 21, 1952, Serial No. 315,974

4 Claims. (Cl. 48—196)

This invention relates to a method for the preparation of a gas comprising essentially carbon monoxide and hydrogen and particularly synthesis gas which is subsequently converted into valuable products.

The invention contemplates preparing carbon monoxide and hydrogen or a gas containing mainly these constituents by reacting a carbonaceous material such as methane with oxygen or an oxygenating gas at combustion temperatures in a zone of gas generation and incorporating a gaseous agent, effective for suppressing carbon formation in the effluent stream, in the resulting hot gas effluent immediately after its issuance from the gas generator. The gaseous agent is preferably precooled prior to its addition to the hot effluent gas. The effluent gas is reduced quickly to a predetermined lower temperature at which it is desired for further treatment as, for example, treatment with a synthesis catalyst under conditions effective for conversion of carbon monoxide and hydrogen into compounds of higher molecular weight. Addition of the gaseous suppressor agent and cooling of the effluent gas is effected simultaneously or in close sequence in the order named.

The invention involves effecting cooling of the effluent gas which is usually at a temperature of at least about 1600° F. to a substantially lower temperature, for example, about 500–600° F. in the presence of an added gaseous agent selected from the group of fully oxidized hydrocarbon combustion products consisting of carbon dioxide and water vapor. Generally, in the production of carbon monoxide and hydrogen by reaction of a carbonaceous material with air, oxygen or oxygen-enriched air, the temperature of the effluent gas is considerably above 1600° F., usually of the order of from about 2200° F. to 2800° F.

Cooling of the effluent gas may be effected in part by addition of suppressing agent in precooled form. It may be effected in part by indirect heat exchange with a suitable cooling medium, and it may also be effected in part by expansion of the effluent gas to a lower pressure.

Reduction of the pressure of the synthesis gas from superatmospheric pressure to a lower pressure also minimizes the formation of carbon during the temperature reduction.

It appears that considerable carbon formation occurs during cooling of the synthesis gas by customary procedure. During temperature reduction, there is encountered an intermediate range of temperatures, between the temperature of the effluent gas and the lower temperature of 500–600° F., wherein the factors influencing carbon formation are optimum. I find that the addition of a gaseous agent of the foregoing character is effective in materially suppressing the formation of carbon during this temperature reduction. By the addition of a suppressor agent, the effective intermediate temperature range for optimum carbon formation is lowered to a region wherein the carbon-forming reaction rates are very slow.

Carbon dioxide and water vapor are the most effective suppressors of carbon formation. Carbon forming reactions are of two types, one type producing carbon dioxide and the other, water, in conjunction with carbon. Addition of these compounds will prevent carbon formation in some of the higher temperature regions and will suppress carbon formation in lower temperature regions wherein the concentrations of hydrogen and carbon monoxide would otherwise permit carbon to form.

If the gaseous agent which is used to suppress carbon formation comprises mainly carbon dioxide, the mixture formed by addition of the suppressor to the synthesis gas may be used directly without further treatment of the catalytic conversion of carbon monoxide and hydrogen into compounds of higher molecular weight. It has been found that the presence of a substantial quantity of carbon dioxide in synthesis gas is advantageous during the hydrogenation of carbon monoxide since carbon dioxide and methane formation are thereby minimized. However, if so desired, carbon dioxide which has been added to the effluent mixture of carbon monoxide and hydrogen may be removed therefrom by contact with an alkaline agent such as triethanolamine prior to the catalytic conversion of carbon monoxide and hydrogen.

If the added suppressor comprises a substantial quantity of steam, the mixture of carbon monoxide, hydrogen and suppressor is cooled sufficiently so as to condense the steam prior to the synthesis step and thus remove excess water.

If carbon dioxide is the sole suppressor added to the mixture of carbon monoxide and hydrogen from the conversion zone, the quantity added should constitute 1 to 75 percent of the quantity of gaseous effluent on a mol bases; preferably the amount added should constitute 5 to 35 percent of the gaseous effluent from the conversion zone on a mol bases. If the gaseous agent which is added as a source of a suppressor of carbon formation contains only a substantial portion of carbon dioxide, such as the tail gas produced in the hydrogenation of carbon monoxide, then the quantity of added suppressor should be so controlled that the added carbon dioxide constitutes between 10 and 100 percent of the total products of conversion on a mol basis.

If water vapor alone is employed as the carbon suppressing additive, the amount of added steam may comprise from 20 to 200 percent of the quantity of gaseous effluent from the conversion zone on a mol basis; preferably added steam should comprise 50 to 100 mol percent of the gaseous effluent.

When the suppressing agent comprises both carbon dioxide and steam, the composition of the added gas should be such that the total added carbon dioxide lies within the range of 1 to 75 mol percent of the total effluent from the conversion zone and preferably within 5 to 35 mol percent, while the added water should constitute 20 to 200 mol percent of the effluent from the conversion zone and preferably 50 to 100 mol percent of the same.

Treatment of the carbon monoxide and hydrogen immediately after issuance from the converter in accord with the method of this invention minimizes carbon formation during the critical period in which the temperature of the carbon monoxide and hydrogen drops from conversion temperature to a lower temperature such as 550° F. at which it is desired to use the carbon monoxide and hydrogen. Many advantages accrue from the fact that carbon formation during this period of temperature drop is virtually eliminated.

First, higher yields of carbon monoxide and hydrogen are obtained.

Secondly, the deleterious effect of finely divided carbon upon the catalyst used for the hydrogenation of carbon monoxide is at least materially reduced. The harmful effect of entrained carbon fines in the synthesis gas is particularly noticeable when a fluid type unit is employed because the entrained carbon adheres to the catalyst and changes its density; changes in catalyst density make it difficult to maintain equal fluidization along the vertical dimensions of the reactor.

In order that the invention may be more aptly described and fully understood, reference will now be made to a flow diagram in which a preferred modification of the invention is illustrated. In the particular preferred modification illustrated, a product gas comprising mainly carbon monoxide and hydrogen is formed by the combustion of methane with a limited quantity of oxygen. The product gas thereby obtained is treated in accord with the method of this invention; carbon monoxide and hydrogen are then catalytically converted to liquid hydrocarbons in the gasoline range.

Methane, or other hydrocarbon gas, obtained from a source not shown, is introduced into a conversion zone 4 through a pipe 1.

Oxygen, also obtained from a source not shown, is introduced into the conversion zone 4 through a pipe 2. The ratio of methane to oxygen is substantially as expressed in the following equation:

$$CH_4 + \tfrac{1}{2} O_2 \rightarrow CO + 2H_2$$

The oxygen content of the reactant mixture may vary from 0.5 to 0.67 mol of oxygen per mol of methane.

Although it is not shown in the drawing, the methane and oxygen stream may be preheated before their entry into the conversion zone 4. Although the streams of reactants are shown entering the conversion zone separately, it is contemplated that they may be premixed prior to their introduction.

In the conversion zone 4, methane and oxygen are converted into carbon monoxide and hydrogen at an elevated temperature. The conversion usually is conducted at temperatures in the range of 1600° to 3000° F. and at pressures varying from atmospheric to 300 pounds per square inch. The conversion zone may be a combustion furnace in which a catalyzed or uncatalyzed partial combustion of methane is effected. An internal combustion reciprocating engine or a gas turbine may also serve as the vehicle for converting methane and oxygen into carbon monoxide and hydrogen. The method of the invention is applicable to the conversion no matter what means are used to effect the conversion of methane into carbon monoxide and hydrogen.

Carbon monoxide and hydrogen issue from the conversion zone 4 through a conduit 6 from which it immediately leads to a heat exchanger 20. Advantageously, the conduit 6 is insulated so that there is no substantial temperature reduction in the gas stream prior to the addition of the suppressing agent.

As the effluent from the conversion enters the exchanger 20, it mixes with steam or chilled carbon dioxide or a combination of the two; the carbon formation suppressor is introduced into the exchanger 20 so as to thoroughly mix with the products of the conversion. Substantial cooling of the products of the conversion is effected by their admixture with steam and chilled carbon dioxide. Simultaneously, further cooling is effected by indirect heat exchange with the cooling element 17 in the exchanger 20.

If the conversion is conducted at superatmospheric pressures, it is desirable to allow the gases to expand to a somewhat lower level during the temperature drop period which is critical for carbon formation. The cooler 20 may be constructed so as to allow expansion of the gases as they enter therein, thereby effecting additional cooling and further suppressing carbon formation.

Steam, which is mixed with the products, is obtained from a source not shown through a pipe 10. The steam is advantageously at a temperature just above the dew point so as to take advantage of the sensible heat of the gas in cooling the carbon monoxide and hydrogen. Steam is introduced into the exchanger 20 through the pipe 10 so that it impinges upon the hot stream of the products thereby effecting thorough mixing.

The gas stream containing a high percentage of carbon dioxide is obtained from a source which will be described in detail later. Carbon dioxide-rich gas advantageously passes through a cooler 15 in which it is chilled and is then introduced into the exchanger 20 through a pipe 16. Carbon dioxide is also introduced into the exchanger 20 in such a manner that it thoroughly mixes with the hot stream of products from the conversion zone.

By cooling in this fashion, the time interval during which the carbon monoxide and hydrogen are within the critical period is reduced to a minimum. Furthermore, the formation of carbon is virtually eliminated by the addition of carbon dioxide and water to the mixture, both of which suppress the carbon formation.

The mixture leaves the cooler 20 through a pipe 22 at a temperature below about 550° F. The exact temperature at which the gaseous mixture leaves the cooler 20 depends upon the contemplated use of carbon monoxide and hydrogen. In the preferred modification of the invention as presented in the drawing, the gaseous mixture leaves the cooler 20 at about 100° F. so that steam is condensed. The pipe 22 leads to a storage tank 24. A draw-off pipe 25 is used to remove condensed water from the mixture in the storage tank 24.

Carbon dioxide may be left in the mixture of carbon monoxide and hydrogen which is to be catalytically converted into hydrocarbons or oxygenated hydrocarbons since its presence is advantageous in such process. Provision may be made, however, to strip carbon dioxide from the mixture of carbon monoxide and hydrogen prior to its use in the catalytic conversion. In this instance, a carbon dioxide stripping unit, not shown, employing an alkaline agent such as triethanolamine is inserted in a line 27 which leads from the storage tank 24 to a catalytic converter 32.

Carbon monoxide and hydrogen are converted in the catalytic converter 32 into hydrocarbons or oxygenated hydrocarbons. Various well-known catalysts which have as their active agent a metal of the eighth group, such as iron, can be used in the converter 32. The converter 32 may be adapted to either fixed bed or fluid type operation. Temperatures ranging from 280° to 650° F. may be employed; the exact temperature range selected depends upon the type of operation, the catalyst and the products which are desired. The pressure at which the conversion takes place may range from atmospheric to 1500 pounds per square inch.

For the purposes of this diagrammatic illustration, the conversion will be described as directed towards the formation of light hydrocarbons in the gasoline range. Unreacted carbon monoxide and hydrogen and the products of conversion, comprising normally gaseous hydrocarbons, carbon dioxide, water, gasoline and gas oil, leave the converter 32 through a pipe 33.

The products of conversion and unreacted carbon monoxide and hydrogen are introduced into a condenser 34 through the pipe 33. In the condenser 34, condensation of the water formed in the synthesis and normally liquid hydrocarbons takes place. The condensed higher boiling hydrocarbons and water and uncondensed gases leave the condenser 34 through a pipe 35 and enter a separator 36.

In the separator 36, there is effected a two-fold separation: first, a separation of the uncondensed gases from the condensed water and heavy hydrocarbons; secondly, the separation of water from the liquid hydrocarbons. Water is withdrawn from the separator 36 through a draw-off pipe 37. The normally gaseous hydrocarbons, together with carbon dioxide, nitrogen, carbon monoxide and hydrogen, leave the separation unit 36 through a pipe 40. Further treatment of this gaseous fraction will be described in detail later.

Liquid hydrocarbons are withdrawn from the separator 36 through a pipe 41 which leads to a fractionating tower 42 in which normally liquid hydrocarbons are fractionated into various valuable fractions. The gasoline fraction is shown leaving the fractionating tower through a pipe 43 and is thereafter piped to storage, not shown. Gas oil is withdrawn from the fractionating tower 42 through a pipe 44 and is thereafter piped to storage, also not shown. A heavy residual oil is withdrawn from the fractionating tower through a pipe 45 and may thereafter be subjected to further treatment.

The normally gaseous hydrocarbons, carbon dioxide, carbon monoxide and hydrogen proceed along the pipe 40 until they reach a Y. At this point, their further treatment depends upon the percentage of carbon dioxide that is present in the gas stream. If carbon dioxide constitutes more than about 30% of the total gas stream, the gas stream may be added directly to the carbon monoxide and hydrogen which issue from the conversion zone 4. If the carbon dioxide constitutes less than about 30% of the total gas stream it will be advisable to strip carbon dioxide from the gas stream in a carbon dioxide absorbing unit from which practically pure carbon dioxide may be obtained upon regeneration of the absorbing medium.

If the gas stream passing along the pipe 40 contains less than about 30% carbon dioxide, it is introduced into a carbon dioxide absorption unit 46. In the unit 46, carbon dioxide is stripped from the gas stream by absorption in an alkaline agent such as triethanolamine. Upon regeneration of the absorbing agent in a separate section of the absorption unit, carbon dioxide is liberated and leaves the absorption unit 46 through a pipe 47. The gases from which carbon dioxide is stripped leave the absorption unit 46 through a pipe 48. This gas stream, comprising carbon monoxide, hydrogen, nitrogen and light hydrocarbon gases such as methane, ethane, etc., may be introduced into the conversion zone 4. In this instance, the gas stream is introduced through the pipe 48 into the pipe 1 through which the fresh feed gas is introduced into the conversion zone 4. A vent 49 provides means of discharging a portion of this gas in order to prevent nitrogen from accumulating in the system.

The carbon dioxide which is separated in the absorption unit 46 proceeds along a pipe 47 through which it is introduced into the cooler 15. In the cooler 15, the carbon dioxide is advantageously at about atmospheric temperature prior to its introduction into the exchanger 20 where it mixes with the carbon monoxide and hydrogen produced in the conversion zone 4.

If the gas stream passing through the pipe 40 contains over about 30% carbon dioxide, the gas stream may bypass the absorption unit 46 through a pipe 51 which leads to the pipe 47. A vent 52 provides means of discharging a portion of this gas in order to prevent accumulation of nitrogen in the system. The gas stream containing carbon dioxide, nitrogen, and light hydrocarbon gases, as well as unreacted carbon monoxide and hydrogen, is advantageously introduced into the cooler 15. From the cooler 15, this gas stream may be directly added to carbon monoxide and hydrogen produced in the conversion zone 4. The carbon dioxide concentration of this stream is sufficient to accomplish the necessary inhibition of carbon formation.

The invention has been described as applied to the conversion of methane and a limited quantity of oxygen into a synthesis gas comprising mainly carbon monoxide and hydrogen. The invention, however, is much broader in scope than this since it is applicable to any process in which a carbonaceous material is converted at elevated temperature and pressure into products comprising mainly carbon monoxide and hydrogen. Thus, all of the following methods of preparing carbon monoxide and hydrogen are included within the scope of the invention: the preparation of water gas by the treatment of coke with steam at an elevated temperature; the conversion of a hydrocarbon gas such as methane with carbon dioxide to produce substantially equi-molecular proportions of carbon monoxide and hydrogen; the conversion of a hydrocarbon gas such as methane with steam to produce carbon monoxide and hydrogen substantially in the ratio of 1:3; oxidation of a material such as shale oil to produce substantially carbon monoxide and hydrogen.

Obviously, many modifications and variation of the invention, as hereinbefore set forth, may be made without departing from the spirit and scope thereof and, therefore, only such limitations should be imposed as are indicated in the appended claims.

This application is a continuation of my copending application, Serial No. 656,480, filed March 22, 1946, now abandoned.

I claim:

1. In a process for the preparation of carbon monoxide wherein a carbonaceous fuel is reacted with free oxygen in proportions effective for partial combustion at an elevated reaction temperature above about 1600° F. forming a product gas comprising carbon monoxide relatively free from carbon dioxide and water vapor and the product gas stream is subsequently cooled by indirect heat exchange with a coolant to a temperature below about 600° F., the improvement which comprises adding to said hot product gas substantially at said reaction temperature subsequent to said reaction and prior to said cooling by indirect heat exchange additional fully oxidized product of combustion selected from the group consisting of carbon dioxide and water vapor in an amount equivalent to at least 20 percent of the total product gas on a mol basis and sufficient to insure at least 20 mol percent of said fully oxidized product gas in the resulting mixture effective to substantially prevent the formation of carbon in the product gas in the temperature range of from about 1600° F. to about 600° F., thereafter effecting cooling of the resulting gas mixture to a temperature not above 600° F. by removing heat therefrom by indirect heat exchange with a coolant, and recovering said fully oxidized product of combustion from said cooled product gas.

2. A process as defined in claim 1 wherein said fully oxidized product of combustion is steam.

3. A process as defined in claim 1 wherein said fully oxidized product of combustion is carbon dioxide.

4. A proces as defined in claim 1 wherein said fully oxidized product of combustion is a mixture of steam and carbon dioxide.

References Cited in the file of this patent

UNITED STATES PATENTS

| | | |
|---|---|---|
| 803,557 | Claudel | Nov. 7, 1905 |
| 1,107,581 | Brownlee et al. | Aug. 18, 1914 |
| 1,107,582 | Brownlee et al. | Aug. 18, 1914 |
| 1,919,857 | Pier et al. | July 25, 1933 |
| 1,980,380 | Burk et al. | Nov. 13, 1934 |
| 2,028,326 | Hanks et al. | Jan. 21, 1936 |
| 2,179,378 | Metzger | Nov. 7, 1939 |
| 2,234,941 | Keith | Mar. 11, 1941 |
| 2,243,869 | Keith et al. | June 3, 1941 |
| 2,274,064 | Howard et al. | Feb. 24, 1942 |
| 2,461,064 | Kemp | Feb. 8, 1949 |
| 2,470,216 | Keith | May 17, 1949 |
| 2,552,737 | Rees | May 15, 1951 |